United States Patent
Twigg

(10) Patent No.: US 6,863,874 B1
(45) Date of Patent: Mar. 8, 2005

(54) PROCESS AND APPARATUS FOR TREATING COMBUSTION EXHAUST GAS

(75) Inventor: Martyn Vincent Twigg, Cambridge (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 09/807,343

(22) PCT Filed: Oct. 4, 1999

(86) PCT No.: PCT/GB99/03281

§ 371 (c)(1),
(2), (4) Date: Jul. 12, 2001

(87) PCT Pub. No.: WO00/21647

PCT Pub. Date: Apr. 20, 2000

(30) Foreign Application Priority Data

Oct. 12, 1998 (GB) ............................................. 9822083
Jul. 21, 1999 (GB) ............................................. 9917042

(51) Int. Cl.⁷ .......................... B01D 50/00; B01D 53/56
(52) U.S. Cl. .......................... 423/212; 60/274; 60/295; 422/171; 422/172; 422/178; 423/213.2; 423/213.5; 423/213.7; 423/239.1
(58) Field of Search .......................... 423/213.2, 213.5, 423/213.7, 239.1, 245.1, 247, 210; 422/168, 169, 170, 171, 172, 177, 178, 180

(56) References Cited

U.S. PATENT DOCUMENTS

| | | | | |
|---|---|---|---|---|
| 4,902,487 A | | 2/1990 | Cooper et al. ........... 423/215.5 |
| 5,315,824 A | * | 5/1994 | Takeshima ................... 60/297 |
| 5,406,790 A | | 4/1995 | Hirota et al. ................. 60/276 |
| 5,662,869 A | * | 9/1997 | Abe et al. .................... 422/171 |
| 5,693,299 A | * | 12/1997 | Chopin et al. ........... 423/213.2 |
| 5,746,989 A | * | 5/1998 | Murachi et al. ........ 423/212 R |
| 5,772,972 A | * | 6/1998 | Hepburn .................. 423/213.5 |
| 6,199,375 B1 | * | 3/2001 | Russell ........................ 60/286 |
| 6,546,717 B1 | * | 4/2003 | Chandler et al. ............. 60/274 |

FOREIGN PATENT DOCUMENTS

| | | | |
|---|---|---|---|
| EP | 0 341 832 | 11/1989 | ............. F01N/3/02 |
| EP | 0 580 389 A1 | 1/1994 | ............. F01N/3/08 |
| EP | 0 628 706 A2 | 12/1994 | ............. F01N/3/10 |
| EP | 0666099 | * 8/1995 | |
| EP | 0 666 099 A1 | 8/1995 | |
| EP | 0 758 713 A1 | 2/1997 | ............. F01N/3/02 |
| EP | 0 778 072 A2 | 6/1997 | ........... B01D/53/94 |
| EP | 0 839 996 A2 | 5/1998 | ............. F01N/3/20 |
| EP | 0 849 441 A1 | 6/1998 | ............. F01N/3/08 |
| EP | 0 862 941 A2 | 9/1998 | ........... B01D/53/94 |
| JP | 62-117620 | 5/1987 | |

* cited by examiner

Primary Examiner—Wayne A. Langel
(74) Attorney, Agent, or Firm—RatnerPrestia

(57) ABSTRACT

A system and method for the control of emissions from a diesel engine exhaust, comprises a catalyst (14) to convert NO to NO₂, a filter (16) to trap soot and hold it for combustion with the NO₂, and a NOx absorber (28), with means to regenerate the NOx absorber by injecting reductant or other reactant (injector 18) upstream of the absorber, and at least during regeneration, passing the exhaust gases leaving the absorber through a three-way catalyst (30).

17 Claims, 1 Drawing Sheet

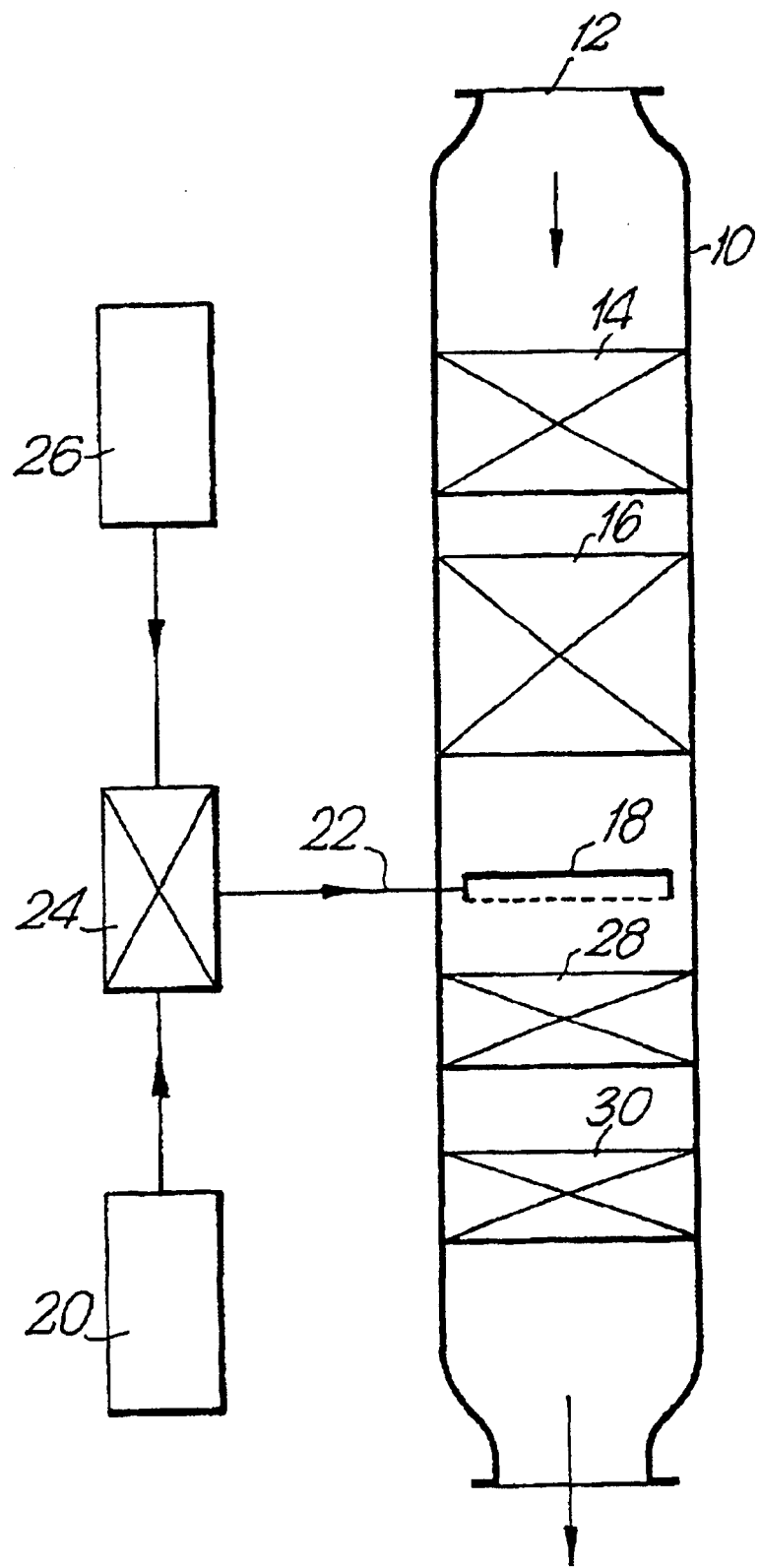

PROCESS AND APPARATUS FOR TREATING COMBUSTION EXHAUST GAS

This invention concerns emission control especially for diesel engine exhaust gas.

EP-A-0341832 and corresponding U.S. Pat. No. 4,902,487 describe a process and treatment system for removing soot from diesel exhaust gas containing NO by passing such gas unfiltered over an oxidation catalyst to convert NO to $NO_2$, collecting the soot on a filter and using the resulting gas containing $NO_2$ to combust the collected soot, the amount of NO converted to $NO_2$ being sufficient to enable such combustion to proceed at a temperature less than 400C.

EP-A-0758713 describes a process in which such a soot combustion step is followed by removing NOx from the combustion outlet gas by means of a solid absorbent and regenerating the absorbent by intermittent engine fuel inlet adjustment or injection of reductant into the exhaust gas upstream of the oxidation catalyst. This process has disadvantages, for example requiring engine modification.

According to the invention there is provided a process for treating combustion exhaust gas containing CO, HC, NO, $O_2$, soot and non-reactive gases, by the steps:
 i. catalysing oxidation of NO to $NO_2$;
 ii. collecting on a filter soot from the product of i;
 iii. combusting the collected soot by reaction with $NO_2$ and possibly also any $O_2$ left over after the reactions in i;
 iv. removing NOx from the product of iii by the action of a regenerable Nox absorbent;
 v. regenerating the absorbent intermittently by:
   (a) decreasing the net oxidant level by injecting reductant upstream of the absorber but downstream of the oxidation catalyst; and/or
   (b) injecting a NOx-specific reactant upstream of the absorbent; and
 vi. at least during said regeneration, subjecting the gas leaving the absorbent to a catalyst system effective to promote reactions of HC and CO with $O_2$ to $H_2O$ and $CO_2$ and of NOx to $N_2$.

The invention provides a treatment system for such exhaust gas comprising catalysts and absorbent corresponding to the process steps, in particular, in combination and in order: a catalyst effective to promote oxidation of at least NO to $NO_2$; a filter effective to collect the soot and hold it for combustion reaction with the $NO_2$ in the gas; a NOx absorber charged with solid absorbent; means for introducing intermittently a regenerant of the absorber, such means being effective to introduce reductant upstream of the absorber but downstream of the oxidation catalyst; and/or to introduce a NOx-specific reactant upstream of the absorber, and, associated with or downstream of the absorber a catalyst system effective to promote reactions of HC and CO with $O_2$ to $H_2O$ and $CO_2$ and of NOx to $N_2$.

In addition, the system may include routine features, for example means to adjust the temperature of the gas to the level required in the next downstream chemical step.

The system may be structured within a single housing ("can"), or in separated housings according to engine design and under-floor or other space considerations. Thus for example for V-engine configurations, some or all of the elements of the system may be disposed in parallel.

The catalysts and absorbent are suitably supported on a ceramic or metal honeycomb, the ceramic comprising one or more of alumina, silica, titania, cordierite, ceria, zirconia, silicon carbide or other, generally oxidic, material. The honeycomb carries a washcoat and, in one or more layers thereon, the active catalytic and/or absorptive material, to be described in more detail below. The honeycomb has typically at least 50, for example 50–400, cells per square inch, possibly more, e.g. up to 800, or up to 1200 if composed structurally of metal. Generally the range 200–800 is preferred for the catalysts and absorbent.

In the oxidation catalyst the active material comprises generally a platinum group metal ("PGM"), especially platinum and/or palladium, optionally with other PGMs, e.g. rhodium, and other catalytic or promoting components. The exact compositions and structure of the oxidation catalyst are not critical to operation of the invention, and hence may be varied according to the requirements of the situation. A low temperature light-off formulation is generally preferred. Conventional manufacturing techniques may be used. The catalyst should of course be sized and composed to achieve the necessary conversions, and the design should minimise trapping of soot within its honeycomb.

The filter may be any capable of trapping the soot without causing excessive back-pressure. In general, ceramic, sintered metal or woven or non-woven wire filters are usable, and wall-flow honeycomb structures may be particularly suitable. The structural material of the filter is preferably porous ceramic oxide, silicon carbide or sintered metal. A coating such as alumina, and also a catalyst such as one or more PGMs (e.g. Pt with MgO) or $La/Cs/V_2O_5$ may be present. The soot is generally carbon and/or heavy hydrocarbons, and is converted to carbon oxides and $H_2O$. Certain embodiments of this principle are in commercial use in Johnson Matthey's Continuously Regenerating Trap technology, and are described in the above-mentioned EP-A-0341832 and U.S. Pat. No. 4,902,487, the teaching of which is incorporated herein by reference.

The $NO_x$ absorbent (referred to also as a "NOx-trap"), to be described further below, may be provided in one unit or a succession of separate units. It may be in the form of active layers on a conventional honeycomb substrate, or may be in the form of serial deposits on a single honeycomb or possibly multiple honeycombs.

The absorbent may be selected from:
 (a) compounds of alkali metals, alkaline earth metals, rare earth metals and transition metals, capable of forming nitrates and/or nitrites of adequate stability in absorbing conditions and of evolving nitrogen oxides and/or nitrogen in regenerating conditions; and/or
 (b) adsorptive materials such as zeolites, carbons and high-area oxides.

Compounds (a) may be present (before NOx absorption) as composite oxides, e.g. of alkaline earth metal and copper such as Ba—Cu—O or $MnO_2$—$BaCuO_2$, possibly with added Ce oxide, or Y—Ba—Cu—O and Y—Sr—Co—O. (The oxides are referred to for simplicity, but in practice hydroxides, carbonates and nitrates are present, depending on the temperature and gas composition). Whichever compounds are used, there may be present also one or more catalytic agents, such as precious metals, effective to promote such reactions as the interchanges of the nitrogen oxides and the action of reductant and/or NOx-specific reactant.

The catalyst system for step vi can be any that is active at the prevailing temperature and not adversely affected by exposure to lean gas between regeneration periods. It may be associated with the absorbent or may, alternatively or additionally, be in a separate bed. Typically it comprises one or more PGMs, especially Pt, Rh, Pd and combinations thereof, on a high-surface washcoat on a honeycomb structure as described above. Suitable catalysts are of the '3-way' or 'SCR' type. Many others have been described in the literature and are available to skilled persons.

If that catalyst system is associated with the absorbent, that is, the absorber is 'catalysed', the catalytic material may be for example co-precipitated or co-impregnated or co-deposited with NOx absorbent or present as one or more sandwiched layers or as fine (e.g. 10–500 microns) particles on or in a layer of absorbent or among particles of absorbent.

For regeneration of the $NO_x$ absorber:

1. as reductant, hydrocarbon may be introduced, for example gasoline or diesel fuel, which is especially convenient, or another such as light oil, kerosene or a C3 to C8 paraffin;
2. as reductant, there may be injected hydrogen (suitably generated in situ on board the vehicle) or a readily dehydrogenatable reductant such as a lower alcohol, especially methanol or ethanol. If reductant is injected as specified, that is, downstream of the oxidation catalyst, introduction of the same or a different reductant upstream of the oxidation catalyst, possibly by engine management, e.g. to provide for reaction increasing gas temperature, is not excluded, but is controlled to give gas lean enough for absorption of NOx to continue. The intermittent reductant injection downstream of the oxidation catalyst then decreases the oxidant content to a NOx desorption level;
3. a preferred technique comprises injecting a $NO_x$-specific reactant, especially a nitrogen hydride for example ammonia or hydrazine. This can be injected as such or as a solution in e.g. water or as a precursor compound, for example urea or aqueous urea solution, producing the reactant in exhaust treatment conditions. Such compounds are referred to herein as 'ammonia' at stages after injection. Injectors for such reactants or compounds, possibly using carrier gas such as air, have been published.

For regeneration using a NOx-specific reactant, the oxidant level can be decreased less, if at all, than when using reductant. Indeed the reactant may be used especially in lean conditions, for example:

(a) exhaust gas as generated by the engine or as issuing from a preceding step of exhaust treatment;
(b) such gas to which reductant short of equivalence has been or is being added;
(c) gas made leaner, for example when the reactant is injected with the aid of air. Regeneration using NOx-specific reactant is also effective in:
(d) rich or equivalent gas and also in gas into which reductant has been introduced e.g. to provide for reaction increasing gas temperature but leaving the gas net-lean in composition.

The point of injection of the reactant may most simply be downstream of the filter; in this event the temperature is typically in the range 150°–300° C. However, injection may be earlier: if upstream of the filter but downstream of the oxidation catalyst, the temperature is typically in the range 250°–350° C. at filter inlet, as required for soot combustion. Further, the reactant may be injected upstream of the oxidation catalyst. Since in such earlier injection the fed reactant is at a 'spike' concentration to react with NOx to be evolved over the short period of regeneration of the absorber, it is in substantial excess over the NOx in the flowing exhaust gas and consequently need not suffer much loss by reaction with NOx. If in an extreme case it were to react with all the flowing NOx to give $N_2$ or $N_2O$, this would stop combustion of soot on the filter: however, owing to the shortness of the ammonia injection spike, any accumulation of soot would be small and combustion would be resumed before blockage took place. The temperature should not be high enough to give substantial oxidation of ammonia to NOx over the oxidation catalyst. To limit unwanted side-reactions of ammonia, it may be introduced as a precursor compound, thus delaying availability of ammonia. Such limitation may also be provided by suitable formulation of the oxidation catalyst and/or filter. In particular, the filter may be of the non-catalysed type, free of deliberately introduced catalytic material such as PGM. Any fortuitous catalytic activity of the filter, due for example to its structural material or accumulated deposits such as carbon, appears not to seriously promote such side-reactions.

The rate of provision of the reactant should be as nearly as possible stoichiometric to the quantity of NOx to be reacted. Especially when injection is to be upstream of the filter, the rate should be controlled in response to measurements of final exit NOx and ammonia. In the process using the reactant there may also be enrichment of the gas by introduction of non-specific reductant.

Decrease of net oxidant level by injection of reductant between the oxidation catalyst and the filter or (preferably) between the filter and the absorbent to provide least interference with soot combustion, suitably produces a gas composition corresponding to an air/fuel weight ratio in the range 10 to equivalence.

Usually the regeneration phase can be a small fraction, e.g. 0.1% to 5%, of engine running time, depending of course on operating conditions.

The invention provides also an engine in combination with the system and a process of operating such an engine. The combination may include established expedients such as electric heating, EGR, or recycle of released $NO_x$ to one or more points upstream of the soot filter.

Control of the process and engine, in particular the means to regenerate the $NO_x$ absorber, includes for example:

1. response to ultimate detection of NOx or ammonia leakage from the absorber and/or final exit gas;
2. response to prediction based on input of data on deliberate or load-responsive engine management variation;
3. allowance for gas composition variations, for example non-steady conditions such as incomplete warm-up or weather. In particular, injection is timed to occur when the temperature is at a level permitting regeneration.

Thus the combination may include sensors for at least one of: fuel composition; air/fuel ratio at engine inlet: exhaust gas compositions and temperatures at critical stages; pressure drop especially over the filter. It may include also indicator means informing the engine operator, computer means effective to evaluate the data from the sensor(s), and control linkages effective to adjust the engine to desired operating conditions taking account of e.g. start-up, varying load and chance fluctuations.

Preferably the engine is a diesel engine, although other engines, including direct injection gasoline engines, may also benefit from the invention. The engine may be the motive power for a vehicle, or may be a stationary power source or auxiliary power source. It may be for a 'heavy duty' vehicle, ie at least 3500 Kg, or a 'light duty' vehicle, including in particular a passenger car or light van and likely to be operated according to the 'urban cycle'.

Desirably, the engine is fuelled with low-sulphur fuel, ie having less than 50 ppm of sulphur, by weight as elemental S. For operation with higher sulphur fuels, a SOx absorbent may be used at some stage upstream of the NOx absorber.

The invention will be more fully understood from the following description of one preferred embodiment thereof, with reference to the accompanying drawing, which shows schematically in a single FIGURE a system of catalysts and absorber suitable for carrying out the invention.

The system consists of single "can" 10, which is connected at 12 to the exhaust from a diesel engine (not shown) fuelled with diesel oil of under 50 ppm sulphur content. At the inlet end of can 10 is catalyst 14, which is a low temperature light-off oxidation catalyst supported on a 400 cells/$in^2$ ceramic honeycomb monolith. Catalyst 14 is designed to be capable of meeting emission regulations in relation to CO and HC for the engine and vehicle and also converts at least 70% of the NO to $NO_2$.

The gas leaving catalyst 14 passes into soot filter 16, which is of the ceramic wall flow type and collects particles over 50 nm. The $NO_2$ and surplus oxygen in the gas oxidise the soot at temperatures around 250° C. with no accumulation or tendency to blocking.

The gas leaving filter 16 is passed over sparging spray injector 18, from which it may receive regenerant fluid such as liquid reductant or NOx-specific reactant such as gaseous ammonia or ammonia precursor from supply tank 20 via line 22. Injector 18 is fed by pump 24 under the control of engine management system 26. Pump 24 suitably acts in a pulse mode and feeds NOx-specific reactant at a rate stoichiometrically equivalent to the NOx to be released.

The gas from 18, possibly carrying regenerant fluid, then enters NOx absorber 28. During normal lean operation of the engine and without injection at 18, absorber 28 substantially removes all NOx flowing. When, however, gas containing injected regenerant reaches it, the NOx is released, and is converted to $N_2$ to an extent depending on whether absorber 28 is catalysed. The gas, if still containing regenerant, NOx and $O_2$, passes into 3-way catalyst 30, where these reactants are brought substantially to chemical equilibrium as non-polluting gases. If such reactions take place sufficiently over absorber 28, the gas leaving 28 is discharged to atmosphere. If a NOx-specific reagent is used as regenerant, catalyst 30 can be an SCR catalyst. Absorber 28 and catalyst 30 may be adjacent or mixed together on a single honeycomb.

The process and system of the invention is expected to be capable of meeting European Stage IV emission legislation, with all regulated emissions comfortably within the standards set.

EXAMPLE 1

NOx-Trap Regeneration with Diesel Fuel

A NOx-trap comprising a 400 cpsi monolith having wall thickness of 6/1000 of an inch, measuring 5.66×6 inches, carrying a coating containing barium (13.2%), platinum (1.7%), rhodium (0.17%), with minor proportions of alumina, ceria and zirconia with a total loading of 3.5 g/$in^3$ was subjected to a CRT-treated gas stream from a 1.9 liter naturally aspirated direct injection diesel engine (Swedish MK-1 fuel) and containing NOx (260 ppm) at a catalyst inlet temperature of 310° C. for 30 seconds during which time it began to become saturated with stored NOx. Upon introduction of MK-1 diesel fuel into the exhaust gas stream in front of the NOx-trap at a rate of 1 g/s for 3 seconds, the NOx-trap regenerated, such that it was able to store NOx once more. The original operating conditions were restored whereby the same amount of NOx was stored, and this process was repeated many times without deterioration of the NOx capacity of the trap.

EXAMPLE 2

NOx-Tray Regeneration with EGR+ Fuel Injection

A NOx-trap as Example 1 was subjected to a CRT-treated gas stream containing NOx (145 ppm) at a catalyst inlet temperature of 220° C. for 30 seconds during which time it stored NOx. The engine was as in Example 1, with EGR to reduce the oxygen concentration in the gas stream. MK-1 Diesel fuel was fed into the exhaust gas stream in front of the NOx-trap at a rate of 1 g/s for 1.5 seconds, to regenerate the NOx-trap: it was then able to store NOx once more. The original operating conditions were restored whereby the same amount of NOx was stored, and this process was repeated many times without deterioration of the NOx capacity of the trap.

Analogous successful runs were performed at other temperatures between 180° C. and 330° C., with fuel injection for different times.

EXAMPLE 3

NOx-Trap Regeneration with Ammonia (a) A NOx-trap as Example 1, but also including palladium (1.7%) was subjected to a gas stream containing NOx (100 ppm), $O_2$ (9.55), $CO_2$ (8.2%) and $H_2O$ (9%) at catalyst inlet temperatures from 200° to 300° C. for 60 seconds during which time it began to saturate with stored NOx. Upon introduction of ammonia (500 ppm) and cutting off $O_2$ for 60 seconds, the NOx-trap regenerated, such that it was able to store NOx once more. Original operating conditions were restored as Example 1.

In each of the above Examples the NOx trap outlet gas became rich during the regeneration period and was at a temperature at which a 3-way Pt/Rh catalyst would decompose NOx, HC and CO present in it.

(b) The run described in paragraph (a) was repeated but with the difference that for each temperature level the flow of gas was maintained with $O_2$ feed cut off and ammonia was injected only long enough to stabilise the temperature; this also fully regenerated the NOx absorber. Then the $O_2$ feed was resumed, initially for 60 seconds without ammonia injection (NOx absorption), then for 60 seconds with ammonia (regeneration); this alternation was maintained for 300 seconds.

Successive 300-second runs were carried out at stepped temperatures. The outlet NOx contents ppm v/v were:

| | |
|---|---|
| 150° –170° C.: | 30–40 |
| 200° : | 30 |
| 250° : | 25 |
| 300° : | 25 rising to 45 |
| 350° : | 25 rising to 100 | it is evident that at over 300° C. there is considerable side reaction of ammonia to NOx. However, at 150°–300° C. absorption of NOx and regeneration by ammonia are effective, even in the presence of $O_2$.

In each of the above Examples the $NO_x$ trap outlet gas became rich during the regeneration period and was at a temperature at which a 3-way Pt/Rh catalyst would decompose $NO_x$, HC and CO present in it.

(c) By way of illustrating injection of ammonia upstream of the filter and use of the ammonia precursor urea, a part-system consisting of item 14 (oxidation catalyst) and item 16 (non-catalysed cordierite soot filter), was set up and equipped between 14 and 16 with a sparging spray injector fed from a reservoir of 32%w/w aqueous urea. The system included sensors for NOx and NO at engine outlet and 16 outlet. The inlet of 14 was fed with the exhaust of a 10 liter Volvo diesel engine. NOx levels were measured initially without urea injection, then at intervals during urea injection at approximate equivalence to the NOx in the gas as received, then after stopping urea injection. Runs were carried out at temperatures in the range 225°–350° C. Gas analyses for 290° C. may be regarded as typical, and were as follows, measured in ppm v/v:

|  | NOx | NO | $NO_2$ |
|---|---|---|---|
| Engine-out | 540 | 505 | 35 |
| 16 out (no urea) | 525 | 200 | 325 |
| 16 out (urea) | 400 | 160 | 240 |
| 16 out (urea stopped) | 520 | 350 | 170 |
| ********************* | check | 170 | 350 |

It is evident that injection of urea has decreased the NOx content of the gas by only about 25%, leaving about 75% of the urea-derived ammonia available for use downstream of filter 16. In a system in which ammonia is to regenerate a NOx absorber, the ratio of ammonia to NOx at the inlet of 16 would be a 'spike', i e, much higher than stoichiometric and fully enough ammonia would reach the NOx absorber. Likewise, such a spike of ammonia, especially if added as urea, would sufficiently escape reaction over oxidation catalyst 14.

What is claimed is:

1. A system for treating combustion exhaust gas, which system comprises a catalyst effective to promote oxidation of at least NO to $NO_2$; a filter downstream of the oxidation catalyst, which filter being effective to collect soot and hold it for combustion reaction with the $NO_2$ in the gas; a NOx absorber downstream of the filter, which NOx absorber is charged with solid adsorbent; means for introducing intermittently a regenerant of the absorber between the filter and the absorber, which means being effective to inject a NOx-specific reactant upstream of the absorber; and a catalyst system effective to promote reactions of hydrocarbons (HC) and CO with $O_2$ to $H_2O$ and $CO_2$ and to convert NOx to $N_2$, wherein said catalyst system is at least one of: (1) associated with the absorber; or (2) located downstream of the absorber.

2. A system according to claim 1, wherein the catalyst system is associated with the absorber.

3. A system according to claim 1, wherein the catalyst system is disposed in a separate bed downstream of the absorber.

4. A system according to claim 1, wherein the NOx absorbent comprises at least one compound selected from the group consisting of (a) alkali metals, alkaline earth metals, rare earth metals and transition metals or a mixed oxide of any two or more thereof; and (b) zeolites, carbons and/or oxides.

5. A system according to claim 1, wherein the NOx absorbent comprises a mixed oxide selected from the group consisting of Ba—Cu—O and $MnO_2$—$BaCuO_2$.

6. A system according to claim 1, wherein the catalyst system comprises at least one compound selected from the group consisting of vanadia/titania and one or more platinum group metal.

7. A system according to claim 1, wherein the injection means is arranged to inject the reactant upstream of the filter.

8. A system according to claim 7, wherein the injection means is arranged to inject the reactant upstream of the oxidation catalyst.

9. A system according to claim 1, wherein the injection means is arranged to inject the reactant downstream of the filter.

10. A system according to claim 1, wherein the filter is catalysed.

11. A system according to claim 1, wherein the injection means is for injecting ammonia, hydrazine, urea or aqueous urea solution.

12. A process for treating combustion exhaust gas containing CO, hydrocarbons (HC), NO, $O_2$, soot and non-reactive gases, comprising the steps of: (i) catalysing oxidation of NO to $NO_2$; (ii) collecting soot on a filter; (iii) combusting the collected soot by reaction with $NO_2$; (iv) removing NOx from the product of step (iii) by contacting a regenerable NOx absorbent with gas containing NOx; (v) regenerating the absorbent intermittently by injecting a NOx-specific reactant downstream of the filter and upstream of the absorbent; and (vi) at least during step (v), contacting a catalyst system effective to promote reactions of HC and CO with $O_2$ to $H_2O$ and $CO_2$ and to convert NOx to $N_2$ with the gas product of step (v).

13. A process according to claim 12, wherein the reactant is injected into: (a) lean exhaust gas as generated by the engine or the product of a preceding step of exhaust treatment; or (b) gas made leaner when the NOx-specific reactant is injected with air.

14. A process according to claim 12, wherein the NOx-specific reactant is ammonia or hydrazine and is injected as such or as a precursor compound decomposable thereto in situ.

15. A process according to claim 14, wherein the precursor is urea or aqueous urea solution.

16. A process according to claim 12, wherein the exhaust gas is the product of combustion of fuel containing less than 50 ppm w/w of sulphur.

17. A system according to claim 1, wherein the NOx absorbent comprises at least one mixed oxide selected from the group consisting of $CeO_2$, Y—Ba—Cu—O and Y—Sr—Co—O.

* * * * *